(12) United States Patent  
Su et al.

(10) Patent No.: US 11,380,016 B2  
(45) Date of Patent: Jul. 5, 2022

(54) FISHEYE CAMERA CALIBRATION SYSTEM, METHOD AND ELECTRONIC DEVICE

(71) Applicant: SICHUAN VISENSING TECHNOLOGY CO., LTD., Chengdu (CN)

(72) Inventors: Xianyu Su, Chengdu (CN); Jia Ai, Chengdu (CN)

(73) Assignee: SICHUAN VISENSING TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 17/505,658

(22) Filed: Oct. 20, 2021

(65) Prior Publication Data

US 2022/0044443 A1 Feb. 10, 2022

Related U.S. Application Data

(63) Continuation-in-part of application No. PCT/CN2019/113441, filed on Oct. 25, 2019.

(30) Foreign Application Priority Data

May 22, 2019 (CN) .......................... 201910431510.7
May 22, 2019 (CN) .......................... 201920745752.9

(51) Int. Cl.
*G06T 7/80* (2017.01)
*G06T 5/00* (2006.01)
*H04N 5/232* (2006.01)

(52) U.S. Cl.
CPC ................ *G06T 7/80* (2017.01); *G06T 5/006* (2013.01); *H04N 5/23238* (2013.01)

(58) Field of Classification Search
None
See application file for complete search history.

(56) References Cited

U.S. PATENT DOCUMENTS

| 2015/0103197 A1 | 4/2015 | Djordjevic et al. |
| 2015/0346471 A1 | 12/2015 | Oliver et al. |
| 2017/0358126 A1 | 12/2017 | Lim et al. |

FOREIGN PATENT DOCUMENTS

| CN | 102096923 A | * | 6/2011 |
| CN | 102096923 A | | 6/2011 |

(Continued)

OTHER PUBLICATIONS

Journal of Harbin Engineering University vol. 37 No. 11, Nov. 30, 2016. Gao Xiuli et al. "Fast fisheye camera calibration method using Stereoscopic calibration board", the whole document.

(Continued)

*Primary Examiner* — Edemio Navas, Jr.

(57) ABSTRACT

Provided are a fisheye camera calibration system, method and an electronic device. The system includes a polyhedral target, a fisheye camera and an electronic device. The polyhedral target includes an inner surface and multiple markers provided on the inner surface, and the inner surface is composed of multiple hexagonal and pentagonal planes. The fisheye camera is used for photographing the polyhedral target to collect a target image, where the polyhedral target and the multiple markers provided on the inner surface of the polyhedral target are captured in the target image. The electronic device is used for acquiring initial values of $k_1$, $k_2$, $k_3$, $k_4$, $k_5$, $u_0$, $v_0$, $m_u$, $m_v$, $T_j$ and $R_j$, and using a Levenberg-Marquardt algorithm to optimize the initial values of $k_1$, $k_2$, $k_3$, $k_4$, $k_5$, $u_0$, $v_0$, $m_u$, $m_v$, $T_j$ and $R_j$ so as to determine imaging model parameters of the fisheye camera.

20 Claims, 7 Drawing Sheets

(56) References Cited

FOREIGN PATENT DOCUMENTS

| CN | 202736126 U |   | 2/2013 |
|----|-------------|---|--------|
| CN | 102982550 A |   | 3/2013 |
| CN | 103035007 A |   | 4/2013 |
| CN | 106548477 A | * | 3/2017 |
| CN | 106548477 A |   | 3/2017 |
| CN | 106815866 A |   | 6/2017 |
| CN | 106846415 A |   | 6/2017 |
| CN | 207663479 U |   | 7/2018 |
| CN | 108592953 A | * | 9/2018 |
| CN | 108592953 A |   | 9/2018 |
| CN | 109242915 A |   | 1/2019 |
| CN | 208313322 U |   | 1/2019 |

OTHER PUBLICATIONS

China Excellent Master's Dissertation Full-text Database Information Technology Series vol. 2013, No. 6, Jun. 15, 2013. Gang-qiang xu, "Camera Calibration and Image Correction for Controllable Distortion Fisheye Lens", I138-931.

China Excellent Master's Dissertation Full-text Database Information Technology Series vol. 2015, No. 3, Mar. 15, 2015. Liu Na, "Research on the Parameters Calibration Method for Binocular Fish-eye lens", I138-1843.

Proceedings of the Seventh IEEE International Conference on Computer Vision, Aug. 6, 2002. Chu-song Chen et al. "New calibration-free Approach for Augmented Reality Based on Parameterized Cuboid Structure", pp. 1-8.

Chinese Lasers, 42 (5), May 31, 2015. Zejun Wu etc."A new calibration method for fisheye lens based on spherical model", pp. 1-8.

Electronics, Dec. 11, 2018. Gwon Hwan An et al. "Charuco Board-based Omnidirectional Camera Calibration Method", pp. 1-15.

(2018 IEEE International Conference on Robotics and Automation (ICRA), Sep. 13, 2018. Guillaume Caron ect al."Spherical Visual Gyroscope for Autonomous Robots Using the Mixture of Photometric Potentials", pp. 820-827.

SIPO, First Office Action for CN Application No. 201910431510.7, dated Nov. 5, 2019.

SIPO, Second Office Action for CN Application No. 201910431510.7, dated Feb. 25, 2020.

SIPO, Office Action issued for CN Application No. 201910431510.7, dated Apr. 21, 2020.

WIPO, Written Opinion of the International Search Authority for PCT Application No. PCT/CN2019/113441, dated Feb. 3, 2020.

WIPO, International Search Report for PCT Application No. PCT/CN2019/113441, dated Feb. 3, 2020.

* cited by examiner

FISHEYE CAMERA CALIBRATION SYSTEM, METHOD AND ELECTRONIC DEVICE

CROSS-REFERENCE TO RELATED APPLICATION

This application is a continuation-in-part of PCT Application PCT/CN2019/113441, filed on Oct. 25, 2019. The PCT Application claims priority to Chinese patent applications No. 201910431510.7 and No. 201920745752.9 which are filed on May 22, 2019, the entire contents of which are incorporated herein by reference.

TECHNICAL FIELD

This disclosure relates to the technical field of camera calibration, and particularly to a fisheye camera calibration system, a fisheye camera calibration method, and an electronic device.

BACKGROUND

Camera calibration is one of the key technologies in machine vision, photogrammetry, 3D imaging, image geometric correction and the like. Camera calibration mainly aims to estimate internal and external parameters of cameras. The accuracy of the calibration result and the stability of the calibration algorithm directly affect the accuracy of subsequent work. In the general calibration methods, multiple images need to be captured, and thus it is necessary to manually move the calibration board or camera. In actual applications, this is not only laborious and time consuming, but also increases the cost of production.

SUMMARY

Embodiments of this disclosure propose a fisheye camera calibration system, a fisheye camera calibration method, a fisheye camera calibration device, an electronic device, and a storage medium, by which the above problems at least can be alleviated.

In a first aspect, the embodiments of the present disclosure provide a fisheye camera calibration system. The system includes a polyhedral target, a fisheye camera, and an electronic device. The polyhedral target includes an inner surface and multiple markers disposed on the inner surface, and the inner surface is composed of multiple hexagonal planes and pentagonal planes. The fisheye camera is configured to photograph the polyhedral target to capture a target image, where the polyhedral target and the multiple markers disposed on the inner surface of the polyhedral target are captured in the target image. The electronic device is configured to fit, according to the target image, a selected radial distortion model with an equidistant projection model, to obtain initial values of distortion parameters $k_1$, $k_2$, $k_3$, $k_4$ and $k_5$; and calculate a radius $r_{max}$ according to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, where $\theta_{max}$ represents a maximum field of view of the fisheye camera. The electronic device is further configured to perform ellipse fitting on the polyhedral target in the target image, and obtain initial values of $u_0$, $v_0$, $m_u$ and $m_v$ according to the fitted ellipse and the value of $r_{max}$, where $(u_0, v_0)$ represents a principal point, $m_u$ represents the number of pixels per unit distance in a horizontal direction of coordinates of the target image, and $m_v$ represents the number of pixels per unit distance in a vertical direction of coordinates of the target image. The electronic device is further configured to acquire, according to the polyhedral target, a translation matrix $T_j$ and a rotation matrix $R_j$ of each of the pentagonal and hexagonal planes where the markers are located. The electronic device is further configured to optimize the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, thereby determining imaging model parameters of the fisheye camera.

In a second aspect, the embodiments of the present disclosure provide a fisheye camera calibration method. The method includes: acquiring a target image, where a polyhedral target and multiple markers disposed on an inner surface of the polyhedral target are captured in the target image; fitting, according to the target image, a selected radial distortion model with an equidistant projection model, to obtain initial values of distortion parameters $k_1$, $k_2$, $k_3$, $k_4$ and $k_5$; calculating a radius $r_{max}$ according to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, where $\theta_{max}$ represents a maximum an represents a maximum field of view of the fisheye camera; performing ellipse fitting on the polyhedral target in the target image, and obtaining initial values of $u_0$, $v_0$, $m_u$ and $m_v$ according to the fitted ellipse and the value of $r_{max}$, where $(u_0, v_0)$ represents a principal point, $m_u$ represents the number of pixels per unit distance in a horizontal direction of coordinates of the target image, and $m_v$ represents the number of pixels per unit distance in a vertical direction of coordinates of the target image; acquiring, according to the polyhedral target, a translation matrix $T_j$ and a rotation matrix $R_j$ of each of the pentagonal and hexagonal planes where the markers are located; and optimizing the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, thereby determining imaging model parameters of the fisheye camera.

In a third aspect, the embodiments of the present disclosure provide a fisheye camera calibration device. The device includes an image acquisition module, a camera calibration module and a numerical optimization module. The image acquisition module is configured to acquire a target image, where a polyhedral target and multiple markers disposed on an inner surface of the polyhedral target are captured in the target image. The camera calibration module is configured to fit, according to the target image, a selected radial distortion model with an equidistant projection model, to obtain initial values of distortion parameters $k_1$, $k_2$, $k_3$, $k_4$ and $k_5$. The camera calibration module is further configured to calculate a radius $r_{max}$ according to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, where $\theta_{max}$ represents a maximum field of view of the fisheye camera. The camera calibration module is further configured to perform ellipse fitting on the polyhedral target in the target image, and obtain initial values of $u_0$, $v_0$, $m_u$ and $m_v$ according to the fitted ellipse and the value of $r_{max}$, where $(u_0, v_0)$ represents a principal point, $m_u$ represents the number of pixels per unit distance in a horizontal direction of coordinates of the target image, and $m_v$ represents the number of pixels per unit distance in a vertical direction of coordinates of the target image. The camera calibration module is further configured to acquire, according to the polyhedral target, a translation matrix $T_j$ and a rotation matrix $R_j$ of each of the pentagonal and hexagonal planes where the markers are located. The numerical optimization module is configured to optimize the initial values of $k_1$, $k_2$, $k_3$, $k_4$, $k_5$, $u_0$, $v_0$, $m_u$, $m_v$, $T$ and $R_j$ by using a Levenberg- Marquardt algorithm, thereby determining imaging model parameters of the fisheye camera.

In a fourth aspect, the embodiments of the present disclosure provide an electronic device. The electronic device includes: one or more processors; a memory; and one or more programs. The one or more programs are stored in the memory and configured to be executed by the one or more processors, and the one or more programs are configured to execute the above-mentioned method.

In a fifth aspect, the embodiments of the present disclosure provide a computer-readable storage medium storing program codes thereon, and the program codes can be invoked by a processor to execute the above-mentioned method.

These and other aspects of the disclosure will be more comprehensive and understandable in the description of the following embodiments.

BRIEF DESCRIPTION OF THE DRAWINGS

In order to explain the technical solutions in the embodiments of the present disclosure more clearly, the drawings needed in the description of the embodiments will be briefly introduced in the following. Obviously, the drawings in the following illustrate only some embodiments of the present disclosure. For those skilled in the art, other drawings can also be obtained based on these drawings without any creative work.

DETAILED DESCRIPTION OF PREFERRED EMBODIMENTS

Figure 1:
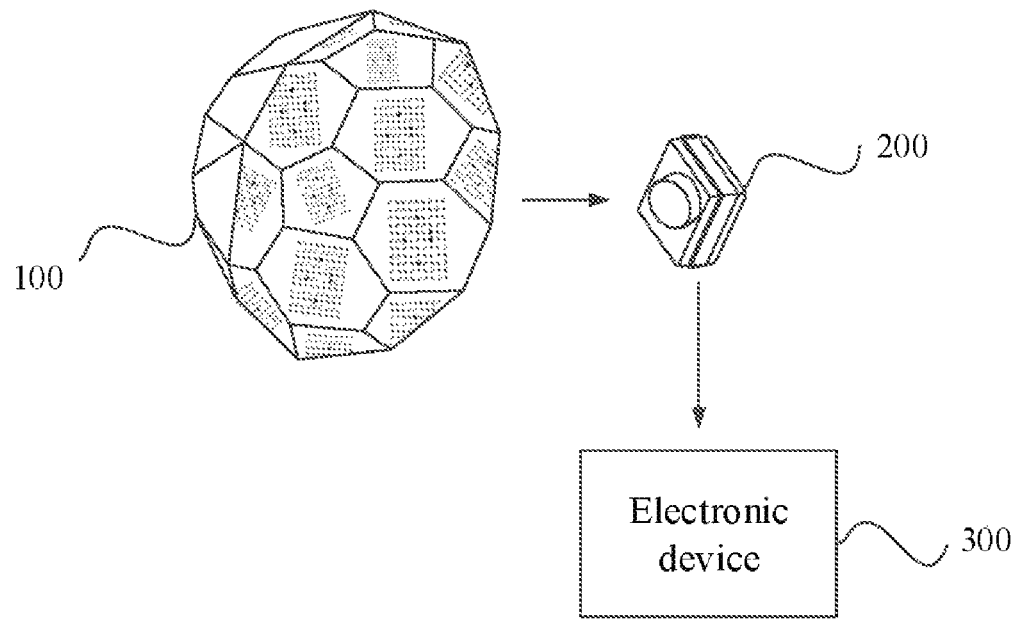
FIG. 1 is a schematic diagram illustrating a fisheye camera calibration system provided by the embodiments of the present disclosure.

In order to enable those skilled in the art to better understand the solutions of the present disclosure, the technical solutions in the embodiments of the present disclosure will be described clearly and completely in conjunction with the drawings hereafter.

Camera calibration is one of the key technologies in machine vision, photogrammetry, 3D imaging, image geometric correction and the like. Camera calibration mainly aims to estimate internal and external parameters of cameras. The accuracy of the calibration result and the stability of the calibration algorithm directly affect the accuracy of subsequent work. The camera having a general field of view can be represented by a pinhole camera model, and can be calibrated by using perspective projection and affine transformation. In recent years, fisheye cameras are widely used in fields such as panoramic vision, video surveillance, vehicle navigation and virtual reality, due to their large field of view. However, the large field of view also brings serious image distortion, which affects the intuitive visual perception of the human eye and the utilization of image information. In order to correct the image distortion, the fisheye cameras need to be calibrated.

At present, the mature calibration methods adopt a planar target, and there are tool software based on the planar target, such as Matlab toolbox and Opencv tool software. In these methods, a planar calibration board is placed at different positions in front of the fisheye camera to capture multiple target images, so as to obtain a wide range of raw data for calibration. In such methods, the calibration board requires to be moved many times so as to be located at different positions for capturing respective target images, or the fisheye camera requires to be rotated many times so as to be located at different angles for capturing respective target images. These methods are not suitable for some situations that require quick installation and calibration of fisheye cameras, such as mass production or assembly lines for fisheye cameras.

In view of this, the inventor proposes a fisheye camera calibration system, method and device, an electronic device, and a storage medium described in the embodiments of the present disclosure. In the embodiments, a target image of a polyhedral target is captured, where the polyhedral target and multiple markers disposed on an inner surface of the polyhedral target are captured in the target image. Based on the target image, a selected radial distortion model is fitted with a selected equidistant projection model, to obtain initial values of distortion parameters $k_1, k_2, k_3, k_4$ and $k_5$. According to the initial values of the distortion parameters $k_1, k_2, k_3, k_4$ and $k_5$ and an equation $r_{max} = k_1\theta_{max} + k_2\theta_{max}^3 + k_3\theta_{max}^5 + k_4\theta_{max}^7 + k_5\theta_{max}^9$, a radius $r_{max}$ is calculated, where $\theta_{max}$ represents a maximum field of view of the fisheye camera. Ellipse fitting is performed on the polyhedral target in the target image, and initial values of $u_0, v_0, m_u$ and $m_v$ are obtained according to the fitted ellipse and the value of $r_{max}$, where $(u_0, v_0)$ represents the principal point of the fisheye camera, $m_u$ represents the number of pixels per unit distance in a horizontal direction of coordinates of the target image, and $m_v$ represents the number of pixels per unit distance in a vertical direction of coordinates of the target image. A translation matrix $T_j$ and a rotation matrix $R_j$ of each of the pentagonal and hexagonal planes where the markers are located are acquired according to the polyhedral target. A Levenberg-Marquardt algorithm is used to optimize the initial values of $k_1$, $k_2$, $k_3$, $k_4$, $k_5$, $u_0$, $v_0$, $m_u$, $m_v$, $T_j$ and $R_j$, to determine imaging model parameters of the fisheye camera. By using the polyhedral target, there is no need to move the target or the camera to capture multiple target images, and only one captured target image is sufficient to realize fast and high-precision calibration of the fisheye camera.

Referring to FIG. 1, a fisheye camera calibration system based on a polyhedral target is provided by the embodiments of the present disclosure. Specifically, the system may include a polyhedral target 100, a fisheye camera 200, and an electronic device 300. The fisheye camera 200 and the electronic device 300 may be one device, or may be two devices. The fisheye camera 200 is a camera with a fisheye lens. The polyhedral target 100 includes an inner surface and multiple markers disposed on the inner surface. The inner surface is formed by splicing multiple polygonal planes together. Vertexes are formed after the multiple polygonal planes are spliced together, and the vertexes are located on a first virtual spherical surface. The distances from the center of sphere of the first virtual spherical surface to the various vertexes are equal. The fisheye camera 200 is disposed at the center of sphere of the first virtual spherical surface, for photographing the polyhedral target 100 to obtain a target image. The polyhedral target and the multiple markers disposed on the inner surface of the polyhedral target are captured in the target image.

The system may further include a light source. The light source is arranged on the same side as the inner surface of the polyhedral target, so that there is sufficient light at the inner surface, and the target image obtained by capturing the polyhedral target 100 with the fisheye camera is clearer, which is beneficial to improve the calibration accuracy of the fisheye camera.

The fisheye camera 200 may send the captured target image to the electronic device 300. The electronic device 300 fits, based on the target image, a selected radial distortion model with a selected equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, the electronic device calculates a radius $r_{max}$, where $\theta_{max}$ represents a maximum field of view of the fisheye camera. The electronic device performs ellipse fitting on the polyhedral target in the target image, and obtains initial values of $u_0$, $v_0$, $m_u$ and $m_v$ according to the fitted ellipse and the value of $r_{max}$, where $(u_0, v_0)$ represents the principal point. According to the polyhedral target, the electronic device acquires a translation matrix $T_j$ and a rotation matrix $R_j$ of each of the pentagonal and hexagonal planes where the markers are located. The electronic device uses the Levenberg-Marquardt algorithm to optimize the initial values of $k_1$, $k_2$, $k_3$, $k_4$, $k_5$, $u_0$, $v_0$, $m_u$, $m_v$, $T_j$ and $R_j$, to determine imaging model parameters of the fisheye camera, thereby calibrating the fisheye camera 200.

Figure 2:
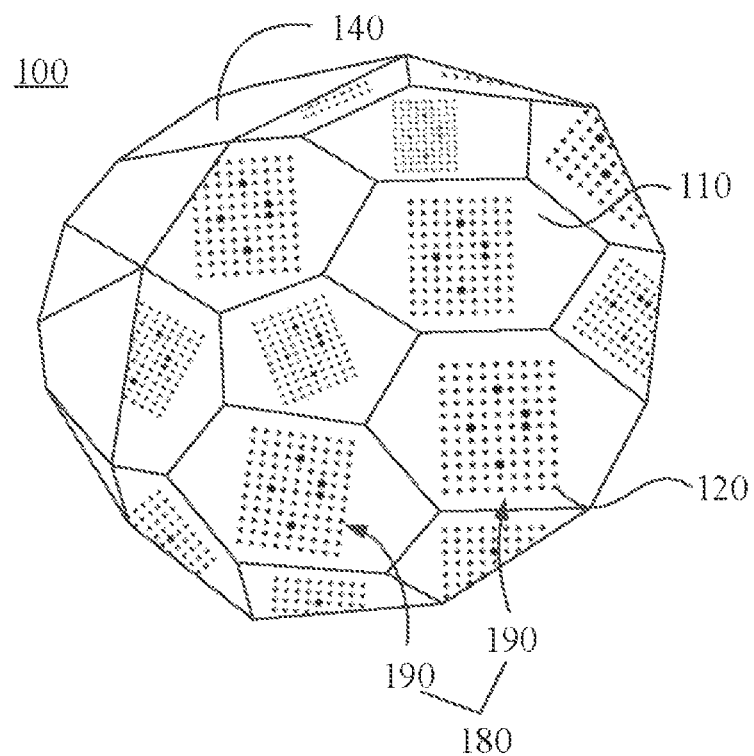
FIG. 2 is a schematic diagram illustrating a polyhedral target provided by the embodiments of the present disclosure.

The polyhedral target 100 includes a housing, an inner surface, and multiple markers disposed on the inner surface. Referring to FIG. 2, a schematic diagram of the polyhedral target provided by the embodiments of the present disclosure is shown. The polyhedral target 100 includes a housing 140, an inner surface 110, and multiple markers 120. The housing may be a polyhedron as shown in FIG. 2, or it may also be hemispherical or rectangular. The shape of the housing can be set as required, which is not limited here. The inner surface 110 is a hemispherical-like inner surface formed by splicing multiple pentagonal and hexagonal planes together. The pentagonal and hexagonal planes can be made from metal sheets such as steel sheets, or other materials that are not easily deformed. The multiple pentagonal and hexagonal planes may be spliced through fixed connection such as welding, or through movable connection such as hinging. The materials and splicing modes of the pentagonal and hexagonal planes can be selected based on actual requirements, which are not limited here.

Figure 3:
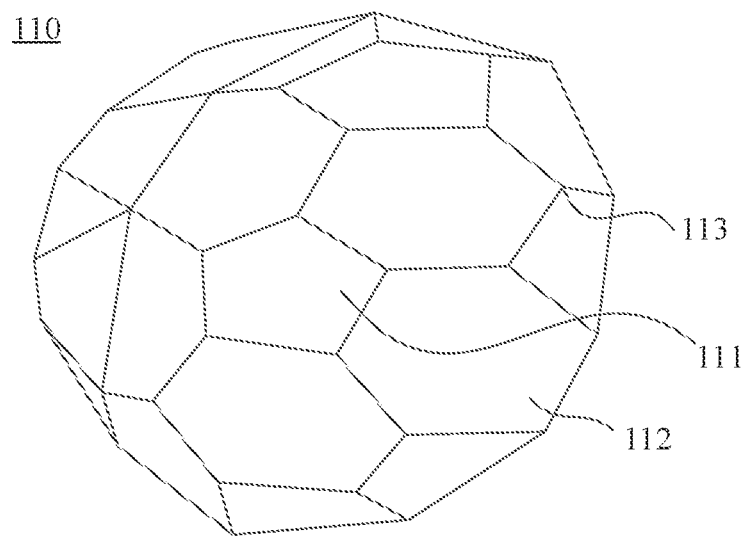
FIG. 3 is a schematic diagram illustrating the splicing of an inner surface of the polyhedral target provided by the embodiments of the present disclosure.
Figure 10A:
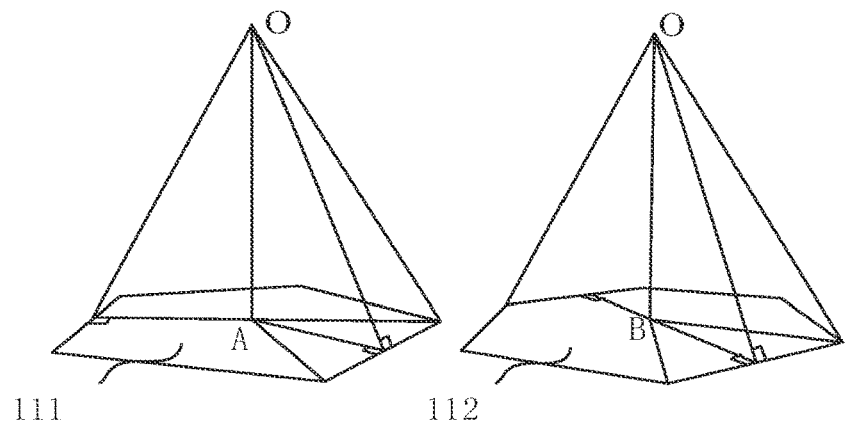
FIG. 10A is a schematic diagram illustrating the relationship between the center of sphere of a first virtual spherical surface and a pentagonal or hexagonal plane according to the embodiments of the present disclosure.
Figure 10B:
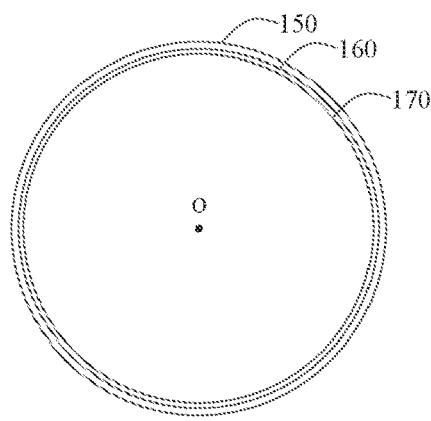
FIG. 10B is a schematic diagram illustrating first, second, and third virtual spherical surfaces according to the embodiments of the present disclosure.

Specifically, the inner surface 110 may be formed by splicing multiple pentagonal planes 111 and multiple hexagonal planes 112 together. Referring to FIG. 3, a schematic diagram illustrating the splicing of the inner surface of the polyhedral target is shown. In the spliced inner surface 110, the number of complete pentagonal planes is 4, the number of complete hexagonal planes is 8, the number of partial pentagonal planes is 4, and the number of partial hexagonal planes is 4. The vertexes 113 of the spliced inner surface 110 of the polyhedral target are located on a first virtual spherical surface 150, that is, the distances from the center of sphere of the first virtual spherical surface to the various vertexes 113 on the inner surface 110 are equal to each other. In addition, all pentagonal planes 111 in the spliced inner surface 110 are tangent to a second virtual spherical surface 160, that is, a line connecting the center of sphere of the second virtual spherical surface and the center of each pentagonal plane 111 is perpendicular to the pentagonal plane 111. All the hexagonal planes 112 in the spliced inner surface 110 are tangent to a third virtual spherical surface 170, that is, a line connecting the center of sphere of the third virtual spherical surface and the center of each hexagonal plane 112 is perpendicular to the hexagonal plane 112. The center of sphere of the first virtual spherical surface, the center of sphere of the second virtual spherical surface, and the center of sphere of the third virtual spherical surface coincide with each other. The schematic cross-section representation of the first, second, and third virtual spherical surfaces is illustrated in FIG. 10B.

It is understandable that the structure of the inner surface 110 of the polyhedral target is similar to that of a football. In particular, it can be understood as one structure obtained by cutting a football along a cross-section passing through the center of sphere of the ball, and the polyhedral target provided by the embodiments of the disclosure may be obtained by cutting the football along a cross-section passing through the center of sphere, in such a manner that the largest number of complete polygonal planes 111 and complete hexagonal planes 112 are obtained. It is understandable that the polyhedral target may also be obtained by cutting the football along a different cross-section passing through the center of sphere, in such a manner that the obtained partial pentagonal and hexagonal planes may not be half pentagonal and hexagonal planes.

Figure 4:
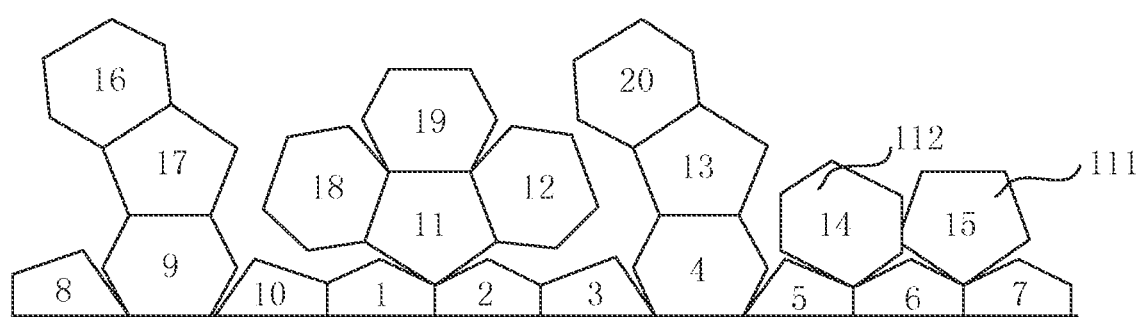
FIG. 4 is an expanded view of the inner surface of the polyhedral target provided the embodiments of the present disclosure.

Referring to FIG. 4, an expanded view of the inner surface of the polyhedral target provided by the embodiments of the present disclosure is shown. It can be seen from the expanded view that the partial pentagonal plane 111 is half of the complete pentagonal plane, and the partial hexagonal plane 112 is half of the complete hexagonal plane. Also referring to FIG. 5, the polyhedral target provided by the embodiments of the present disclosure is illustrated at a first angle of view. The first angle of view is defined as an angle of view that passes through the center of sphere of the first virtual spherical surface and is perpendicular to an opposite face of the inner surface 110. At the first angle of view, the half hexagonal planes 112 numbered 1, 2, 6 and 7 are parallel to the direction of the first angle of view, and each of them is projected as a line; and the half pentagonal planes 111 numbered 3, 5, 8 and 10 are also parallel to the direction of the first angle of view, and each of them is projected as a line.

Figure 6:
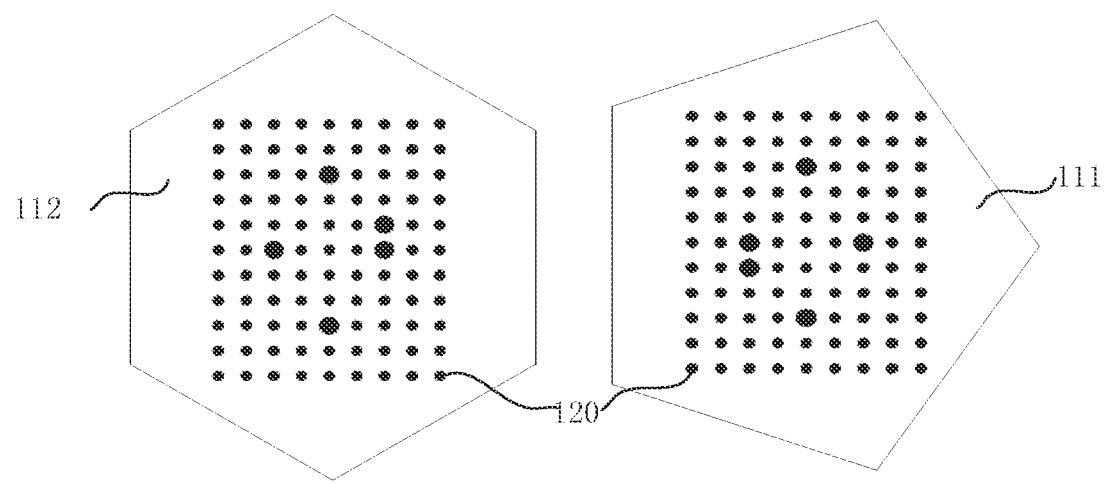
FIG. 6 is a schematic diagram illustrating a marker sub-layer attached onto a pentagonal or hexagonal plane according to the embodiments of the present disclosure.

In some embodiments, the markers 120 may be provided on a marker layer 180, and the marker layer is arranged on the inner surface 110. The marker layer includes multiple marker sub-layers 190, that is, the marker layer is divided into multiple marker layers and each marker sub-layer corresponds to one of the divided marker layers. The marker sub-layer may be a circular mark pattern, or a checkerboard mark pattern. The marker sub-layer includes multiple markers 120, and the markers 120 thereof may have different sizes. Specifically, the markers 120 of the polyhedral target are distributed on the multiple pentagonal and hexagonal planes which are spliced together to form the inner surface 110. The markers may be black, and the pentagonal and hexagonal planes on which the markers are arranged may be white, so that the markers can be easily distinguished from the pentagonal and hexagonal planes in the target image. Referring to FIG. 6, a schematic diagram illustrating that the marker sub-layer on which the markers are located is attached onto the pentagonal or hexagonal plane according to the embodiments of the present disclosure is shown. The marker sub-layer is attached onto the pentagonal plane 111 or the hexagonal plane 112; in specific, one marker sub-layer is attached onto one pentagonal plane and one marker sub-layer is attached onto one hexagonal plane. The center of the marker sub-layer coincides with the center of the pentagonal plane 111 or the hexagonal plane 112, and at least one side of the marker sub-layer is parallel to one side of the pentagonal plane 111 or the hexagonal plane 112.

Specifically, as shown in FIG. 6, the marker layer is composed of multiple marker sub-layers, and each marker sub-layer includes multiple markers 120 of different sizes. The markers 120 of different sizes in each marker sub-layer form a marker pattern of the marker layer. Different marker sub-layers form different marker patterns. After the fisheye camera 200 captures the polyhedral target 100 to obtain the target image, the corresponding relationship between the markers in the target image and the markers 120 on the polyhedral target can be determined according to the marker patterns of the marker sub-layers.

Figure 7:
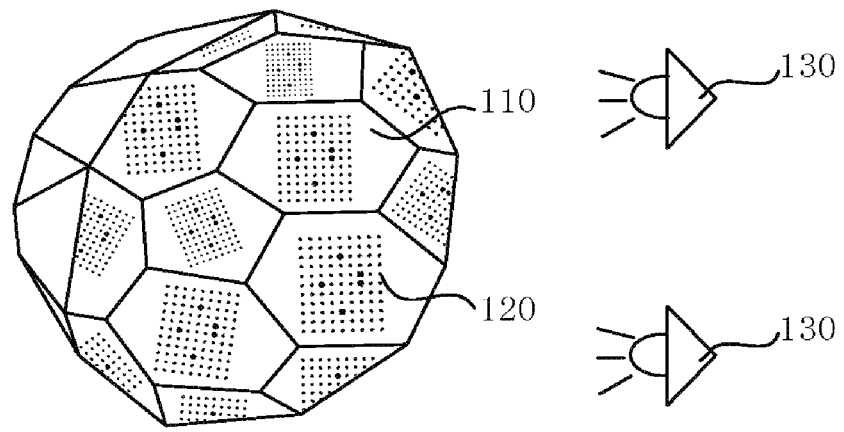
FIG. 7 is a schematic diagram illustrating the arrangement of a light source provided by the embodiments of the present disclosure.

Referring to FIG. 7, a schematic diagram illustrating the arrangement of a light source according to the embodiments of the present disclosure is shown. The polyhedral target may further include at least one light source 130. The at least one light source 130 may be arranged on the same side as the inner surface of the polyhedral target. By the provision of the light source 130, there is sufficient light at the inner surface 110, and the target image obtained by capturing the polyhedral target 100 with the fisheye camera is clearer, which is beneficial to improve the calibration accuracy of the fisheye camera.

Figure 8:
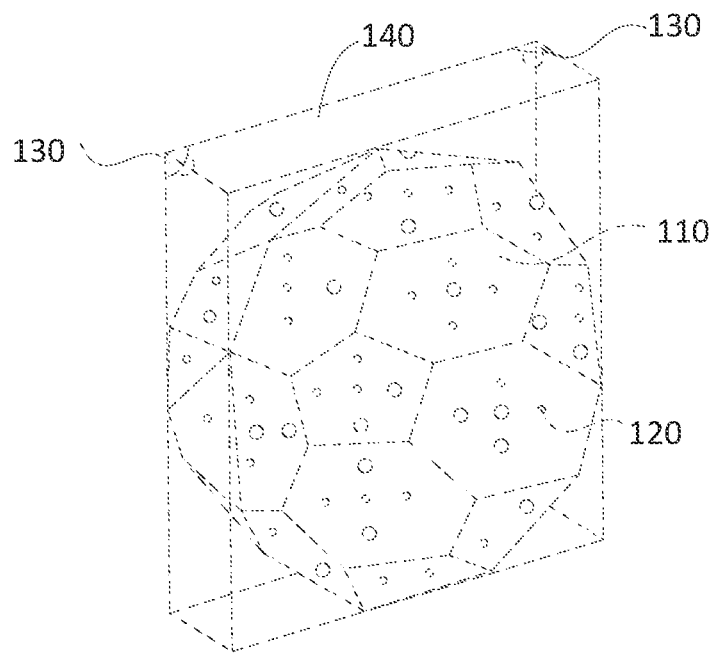
FIG. 8 is a schematic diagram illustrating another polyhedral target provided by the embodiments of the present disclosure.

In some embodiments, the markers may be provided by multiple holes formed in the inner surface 110. Referring to FIG. 8, a schematic diagram of a polyhedral target provided by the embodiments of the present disclosure is shown. The multiple holes formed in the inner surface may have different sizes. The markers 120 of different sizes on each pentagonal or hexagonal plane form one marker pattern. On different pentagonal and hexagonal planes, different marker patterns may be formed. Of course, the size and distribution of the holes can be set according to actual requirements, which is not limited here. Correspondingly, as shown in FIG. 7, the polyhedral target includes at least one light source 130, and the at least one light source 130 is disposed inside the housing 140 of the polyhedral target at an opposite side from the inner surface. For example, the at least one light source may be disposed at one or more corners of the rectangular housing. The markers 120 are formed on the hemispherical inner surface 111 when light emitted from the light source 130 passes through the holes, i.e., the markers are formed on the inner surface by the light that is emitted from the light source and passes through the holes. In this case, the inner surface may be black. As such, the target image can be obtained by capturing the polyhedral target with the fisheye camera, for calibrating the fisheye camera.

Figure 9:
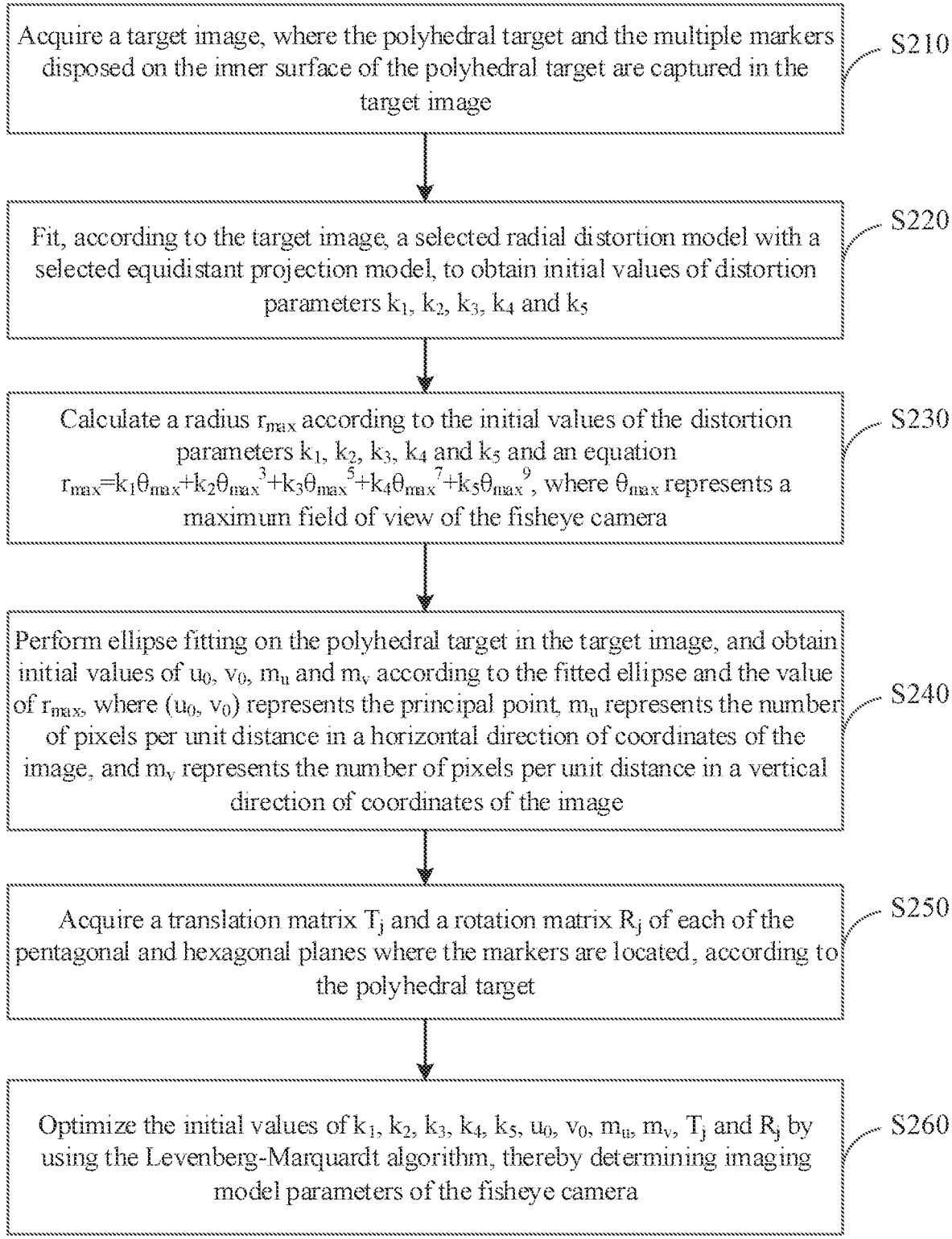
FIG. 9 is a flowchart illustrating a fisheye camera calibration method provided by the embodiments of the present disclosure.

Referring to FIG. 9, a fisheye camera calibration method provided by the embodiments of the present disclosure is illustrated, which is applied to the above fisheye camera calibration system. Specifically, the method may include operations as follow.

At block S210, a target image is acquired, where the polyhedral target and the multiple markers disposed on the inner surface of the polyhedral target are captured in the target image.

The electronic device can obtain the target image captured by the fisheye camera. Specifically, the electronic device can receive the target image sent by the fisheye camera through a network or the like, or it can obtain the target image through a U disk or a memory card. In the target image, the polyhedral target and the multiple markers disposed on the inner surface of the polyhedral target are captured.

At block S220, according to the target image, a selected radial distortion model is fitted with a selected equidistant projection model, to obtain initial values of distortion parameters $k_1$, $k_2$, $k_3$, $k_4$ and $k_5$.

The imaging of common cameras follows the pinhole camera model, in which straight lines in the actual scene are still projected as straight lines on the image plane in the imaging process. However, if the imaging of the fisheye camera follows the pinhole camera model, the projected image becomes very large; and when the camera's field of view reaches 180 degrees, the image becomes enormously large. Therefore, due to the ultra-wide field of view characteristics of the fisheye camera, a field of view of hemisphere cannot be projected onto a limited image plane through projection transformation, and other models have to be adopted.

In the embodiments of this disclosure, an equidistant projection model is selected as the fisheye camera model. The way of equidistant projection may be represented by $r=f\theta$, where r represents the distance from any point in the target image to the distortion center, f represents the focal length of the fisheye camera, and θ represents an angle between the incident light and the optical axis of the fisheye camera.

Since the projection model of the fisheye camera enables the largest possible scene to be projected into a limited image plane, this results in camera distortions, and particularly, the radial distortion of the fisheye camera is serious. Accordingly, the radial distortion of the fisheye camera is mainly considered. When only the radial distortion of the fisheye camera is considered, based on the equidistant projection model that is selected as the fisheye camera model, the radial distortion model of the fisheye camera can be represented as:

$$r(\theta)=k_1\theta+k_2\theta^3+k_3\theta^5+k_4\theta^7+k_5\theta^9+\ldots$$

where r is a distance between a pixel on the target image and the principal point of the camera system, θ is the angle between the incident light and the optical axis of the camera system, $k_1$, $k_2$, $k_3$, $k_4$ and $k_5$ are 5 distortion parameters in the radial distortion model of the fisheye camera, which constitute the internal parameters of the fisheye camera together with other 4 parameters $u_0$, $v_0$, $m_u$ and $m_v$. In this model, the distortion parameters are not limited to $k_1$, $k_2$, $k_3$, $k_4$ and $k_5$, and $k_6$, $k_7$, . . . $k_n$ may also be included. In the embodiments of this disclosure, it is illustrated by taking a case where only $k_1$, $k_2$, $k_3$, $k_4$ and $k_5$ are used and accordingly, 9 internal parameters, including $k_1$, $k_2$, $k_3$, $k_4$, $k_5$, $u_0$, $v_0$, $m_u$ and $m_v$, are adopted to express the imaging characteristics of the fisheye camera, as an example.

The selected radial distortion model, i.e., $r(\theta)=k_1\theta+k_2\theta^3+k_3\theta^5+k_4\theta^7+k_5\theta^9+\ldots$ is fitted with the equidistant projection model $r=f\theta$. Among the distortion parameters, the influence of high-order distortion parameters is relatively small. Thus, in calculating the initial values, the initial values of the high-order distortion parameters may be set as 0. That is, $k_3=0$, $k_4=0$, and $k_5=0$. Accordingly, in the embodiments of this disclosure, the radial distortion model may be represented as $r=k_1\theta+k_2\theta^3$. This radial distortion model is fitted with the required projection model $r=f\theta$, and by using the focal length f and maximum field of view which are parameters provided by the manufacturer (for example, the focal length of a fisheye camera is 8 mm, and the maximum field of view of the fisheye camera $\theta_{max}$ is 180 degrees), $k_1=f$ and $k_2=0$ can be obtained.

At block S230, a radius $r_{max}$ is calculated according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view of the fisheye camera.

Since $k_1=f$, $k_2=0$, and $k_3$, $k_4$, and $k_5$ are all initially set as 0, and the radius is represented by an equation $r_{max}=k_1\theta_{max}+k_2\theta_{max}^3+k_3\theta_{max}^5+k_4\theta_{max}^7+k_5\theta_{max}^9$, the radius can be calculated as $r_{max}=f\theta_{max}$. Taking the aforementioned fisheye camera with a focal length f of 8 mm and a maximum field of view of 180 degrees as an example, the obtained values of the distortion parameters and the maximum field of view of the fisheye camera of 180 degrees, i.e., $\theta_{max}=\pi2$, are substituted into the equation $r_{max}=k_1\theta_{max}+k_2\theta_{max}^3+k_3\theta_{max}^5+k_4\theta_{max}^7+k_5\theta_{max}^9$, thereby obtaining $r_{max}=f^*\pi/2$.

At block S240, ellipse fitting is performed on the polyhedral target in the target image, and initial values of $u_0$, $v_0$, $m_u$ and $m_v$ are obtained according to the fitted ellipse and the value of $r_{max}$, where ($u_0$, $v_0$) represents the principal point, $m_u$ represents the number of pixels per unit distance in a horizontal direction of coordinates of the image, and $m_v$ represents the number of pixels per unit distance in a vertical direction of coordinates of the image.

Among them, ($u_0$, $v_0$) represents the principal point, $m_u$ represents the number of pixels per unit distance in the horizontal direction of coordinates of the image, and $m_v$ represents the number of pixels per unit distance in the vertical direction of coordinates of the image. The ellipse fitting is performed on the polyhedral target in the target image, so as to obtain the initial values of $u_0$, $v_0$, $m_u$ and $m_v$, where a is the length of the major axis of an ellipse, and b is the length of the minor axis of the ellipse.

Figure 5:
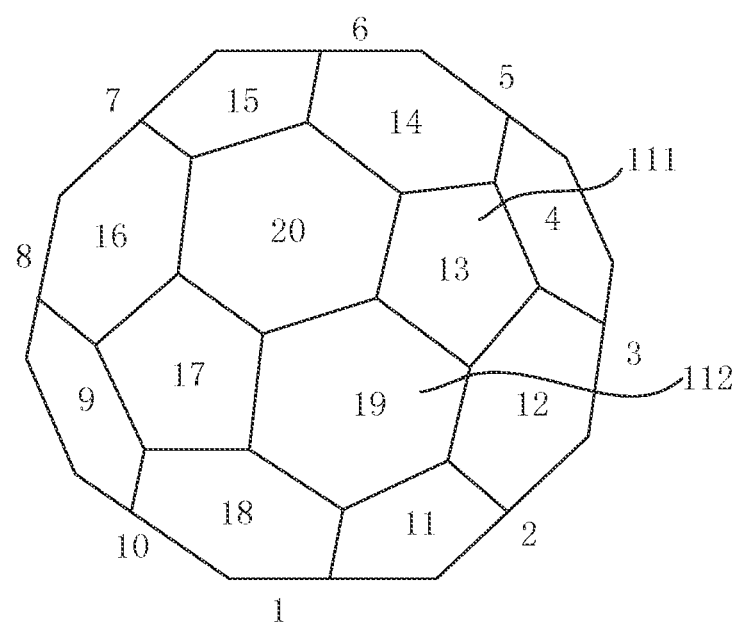
FIG. 5 illustrates the polyhedral target at a first angle of view that is provided by the embodiments of the present disclosure.

Since the inner surface of the polyhedral target is captured in the target image, and the inner surface is a hemispherical-like inner surface, the boundary of which resembles a circle in space, as shown in FIG. 5, an ellipse is approximately obtained when the circle is imaged in the image coordinate system. Thus, an ellipse is fitted from the obtained boundary points of the circle in the image. By extracting the boundary of the ellipse, the length a of the major axis of the ellipse and the length b of the minor axis of the ellipse can be obtained. Specifically, the ellipse fitting equation is $$\left(\frac{u-u_0}{a}\right)^2+\left(\frac{v-v_0}{b}\right)^2=1,$$

in which the values of a and b can be obtained through measurements on the ellipse fitted from the target image, and thus the values of the principal point ($u_0$, $v_0$) can be calculated therefrom.

In some embodiments, according to the values of a and b as well as equations $m_u=a/r_{max}$ and $m_v=b/r_{max}$, the initial values of $m_u$ and $m_v$ are obtained. According to the fitted ellipse, the length a of the major axis of the ellipse and the length b of the minor axis of the ellipse can be obtained. Since the radius is calculated by the equation $r_{max}=k_1\theta_{max}+k_2\theta_{max}^3+k_3\theta_{max}^5+k_4\theta_{max}^7+k_5\theta_{max}^9$, $k_1=f$, $k_2=0$, $k_3$, $k_4$, and $k_5$ are all set as 0, $r_{max}=f\theta_{max}$ is resulted. On the basis of this, the initial values of $m_u$ and $m_v$ are obtained according to the values of a and b and the equations $m_u=a/r_{max}$ and $m_v b/r_{max}$.

In some embodiments, for a full-frame camera, the principal point may be initially set at the center of the image, and the initial values of $m_u$ and $m_v$ are obtained by using the pixel size given by the fisheye camera manufacturer, where $m_u$ represents the number of pixels per unit distance in the horizontal direction of coordinates of the image, and $m_v$ represents the number of pixels per unit distance in the vertical direction of coordinates of the image.

At block S250, a translation matrix $T_j$ and a rotation matrix $R_j$ of each of the pentagonal and hexagonal planes where the markers are located are acquired according to the polyhedral target.

The pentagonal and hexagonal planes where the markers are located refer to planes on which the marker layer of the markers is attached (that is, the pentagonal planes or the hexagonal planes on which the marker layer is attached). Specifically, the translation matrix $T_j$ and the rotation matrix $R_j$ of each of the pentagonal and hexagonal planes where the markers are located can be obtained according to the splicing relationship of the polyhedral target. The splicing of the polyhedral target can be referred to the corresponding contents of the foregoing embodiments, which will not be repeated here for concise.

The line connecting the center of sphere of the first virtual spherical surface and the center of each pentagonal plane is perpendicular to the pentagonal plane, and the line connecting the center of sphere of the first virtual spherical surface and the center of each hexagonal plane is perpendicular to the hexagonal plane. Referring to FIG. 10, a schematic diagram of the relationship between the center of sphere of the first virtual spherical surface and the pentagonal or hexagonal plane is shown. In which, point O represents the center of sphere of the first virtual spherical surface, the center of the pentagonal plane 111 is represented by point A, the line connecting the center of sphere of the first virtual spherical surface and the center of the pentagonal plane is a line segment OA, and the line segment OA is perpendicular to the pentagonal plane 111. The center of the hexagonal plane 112 is represented by point B, the line connecting the center of sphere of the first virtual spherical surface and the center of the hexagonal plane is a line segment OB, and the line segment OB is perpendicular to the hexagonal plane 112.

Through the triangle relationships, the angles between the pentagonal planes and the hexagonal planes which are spliced for the polyhedral target can be calculated, and the angles between the hexagonal planes which are spliced for the polyhedral target can be calculated. Referring to the expanded view of the inner surface of the polyhedral target shown in FIG. 4 and the polyhedral target at the first angle of view shown in FIG. 5, if the radius of the first virtual spherical surface is set as $R_j$ the central angles corresponding to the line segments of the pentagonal or hexagonal planes shown in FIG. 4 may be expressed by trigonometric functions containing "R". For example, the central angles corresponding to the line segments on the bottom sides of the pentagonal and hexagonal planes numbered 1 to 10 shown in FIG. 4 can be expressed by trigonometric functions containing "R". As can be seen from FIG. 5, these line segments on the bottom sides of the pentagonal and hexagonal planes numbered 1 to 10 define a closed decagon around the center of sphere of the first virtual spherical surface. The sum of the central angles corresponding to the ten sides of the decagon should be equal to 360 degrees. The value of R can be calculated by solving the inverse trigonometric function. From this, the value of the radius of the second virtual spherical surface, the value of the radius of the third virtual spherical surface, and the angles between the pentagonal planes and the hexagonal planes can be obtained.

Therefore, the position of each of the pentagonal and hexagonal planes can be calculated using its rotation matrix $R_j$ and translation vector $T_j$ relative to a world coordinate system. The calculated rotation matrix $R_j$ and translation vector $T_j$ will also be used as initial values of the camera parameters to be optimized.

The world coordinate system is established according to the polyhedral target, in which the origin of the world coordinate system is set at the center of sphere of the first virtual spherical surface. According to the established world coordinate system, for each of the pentagonal and hexagonal planes that are spliced together for the polyhedral target, its position relative to the world coordinate system can be expressed by the calculated rotation matrix $R_j$ and translation matrix $T_j$.

Marker layers are arranged on the polygonal planes, where the polygonal planes include the pentagonal and hexagonal planes. Since the center of each marker layer coincides with the center of the respective pentagonal or hexagonal plane, and one side of the marker layer is parallel to one side of the respective pentagonal or hexagonal plane, the positions of the markers of each marker layer on the respective pentagonal or hexagonal plane can be obtained, thereby obtaining the coordinates of these markers relative to the world coordinate system. Since the markers on each marker layer may have different sizes, and the markers on different marker layers may form different marker patterns, the corresponding relationship between the markers in the target image and the markers on the actual polyhedral target can determined based on the marker patterns, and the marker layer corresponding to the markers can be determined therefrom.

In this way, the coordinates of the marker in the marker layer may be expressed as $X^i=(X^i, Y^i, 0)^T$, where $X^i$ represents the position vector of an i-th marker on the pentagonal or hexagonal plane, $X^i$ represents the X coordinate of the vector on the pentagonal or hexagonal plane, and $Y^i$ represents the Y coordinate of the vector on the pentagonal or hexagonal plane. Therefore, the marker in the marker layer attached on each pentagonal or hexagonal plane (i.e., polygonal plane) may be expressed as $X_c(j, i)=R_jX(j, i)+T_j$, where $X_c(j, i)$ represents the world coordinates of an i-th marker on a j-th polygonal plane. In which, j is not less than 20, that is, the number of the polygonal planes is not less than 20. $X_c(j, i)$ may be further expressed in the form of three components $(X_c^x, X_c^y, X_c^z)$ in the world coordinate system, that is, $X_c(j, i)=(X_c^x, X_c^y, X_c^z)^T$, from which the world coordinates of each marker in the marker layer attached on the pentagonal or hexagonal plane can be obtained.

Since the origin of the world coordinate system is set at the center of sphere of the first virtual spherical surface, and the XY plane of the world coordinate system coincides with the bottom side of the inner surface of the polyhedral target, the longitude and latitude of the i-th marker on the j-th polygonal plane in the world coordinate system can be obtained as:

$$\theta(j, i) = \arctan\left(\frac{\sqrt{(X_c^y)^2 + (X_c^x)^2}}{X_c^z}\right), \varphi(j, i) = \arctan\left(\frac{X_c^y}{X_c^x}\right).$$

Thus, the longitude and latitude of each marker on the polyhedral target in the world coordinate system can be obtained.

At block S260, the initial values of $k_1$, $k_2$, $k_3$, $k_4$, $k_5$, $u_0$, $v_0$, $m_u$, $m_v$, $T_j$ and $R_j$ are optimized by using the Levenberg-Marquardt algorithm, thereby determining imaging model parameters of the fisheye camera.

After the initial values of $k_1$, $k_2$, $k_3$, $k_4$, $k_5$, $u_0$, $v_0$, $m_u$, $m_v$, $T_j$ and $R_j$ are obtained, the Levenberg-Marquardt algorithm may be used to optimize the initial values of $k_1$, $k_2$, $u_0$, $v_0$, $m_u$, $m_v$, $T_j$ and $R_j$ and optimize the initial values of the high-order distortion parameters $k_3$, $k_4$ and $k_5$ which are initially set as 0, to determine the imaging model parameters of the fisheye camera.

Specifically, the sum of squares of the differences between the projection values and respective measurement values of the markers provided on the target is minimized, that is, the difference between the projection value and respective measurement value of each marker provided on the target is calculated and the sum of squares of the differences of all the markers is minimized. The projection value of one marker refers to the pixel coordinates corresponding to the marker that are calculated according to the projection model, after the world coordinates corresponding to the marker are obtained from the word coordinate system established basing on the polyhedral target; and the measurement value of the marker refers to the pixel coordinates corresponding to the marker in the target image under the image coordinate system, after the polyhedral target is captured by the fisheye camera.

In the fisheye camera calibration method provided by the embodiments of this disclosure, the target image of the polyhedral target is captured, where the polyhedral target and the multiple markers disposed on the inner surface of the polyhedral target are captured in the target image. Based on the target image, the selected radial distortion model is fitted with the selected equidistant projection model, to obtain initial values of the distortion parameters $k_1$, $k_2$, $k_3$, $k_4$ and $k_5$. Ellipse fitting is performed on the polyhedral target in the target image, to obtain initial values of $u_0$, $v_0$, $m_u$ and $m_v$, where $m_u$ represents the number of pixels per unit distance in the horizontal direction of coordinates of the image, and $m_v$ represents the number of pixels per unit distance in the vertical direction of coordinates of the image. The translation matrix $T_j$ and rotation matrix $R_j$ of each of the pentagonal and hexagonal planes where the markers are located are acquired according to the polyhedral target. The initial values of the high-order distortion parameters $k_3$, $k_4$ and $k_5$ are set as 0. The Levenberg-Marquardt algorithm is used to optimize the initial values of these parameters ($k_1$, $k_2$, $k_3$, $k_4$, $k_5$, $u_0$, $v_0$, $m_u$, $m_v$, $T_j$ and $R_j$), to determine the imaging model parameters of the fisheye camera. By capturing the target image of the polyhedral target, there is no need to move the target or the camera to capture multiple target images, and only one target image is sufficient to realize fast and high-precision calibration of the fisheye camera.

Figure 11:
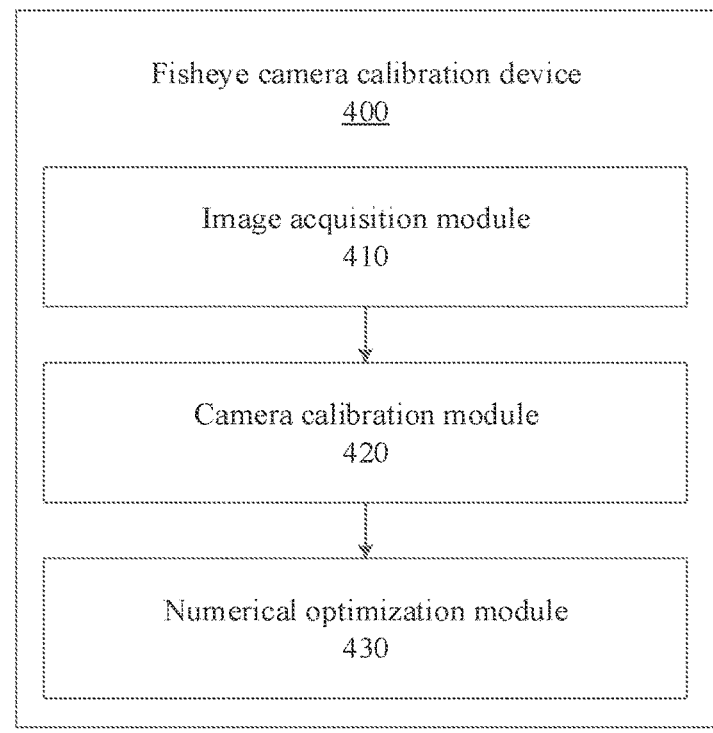
FIG. 11 a structural block diagram illustrating a fisheye camera calibration device provided by the embodiments of the present disclosure.

Referring to FIG. 11, a fisheye camera calibration device 400 provided by the embodiments of the present disclosure is illustrated. The device 400 includes an image acquisition module 410, a camera calibration module 420, and a numerical optimization module 430.

The image acquisition module 410 is configured to acquire a target image, where the polyhedral target and the multiple markers disposed on the inner surface of the polyhedral target are captured in the target image. The camera calibration module 420 is configured to fit, according to the target image, a selected radial distortion model with an equidistant projection model, to obtain initial values of distortion parameters $k_1$, $k_2$, $k_3$, $k_4$ and $k_5$. The camera calibration module is further configured to calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view of the fisheye camera. The camera calibration module is further configured to perform ellipse fitting on the polyhedral target in the target image, and obtain initial values of $u_0$, $v_0$, $m_u$ and $m_v$ according to the fitted ellipse and the value of $r_{max}$, where ($u_0$, $v_0$) represents the principle point, $m_u$ represents the number of pixels per unit distance in the horizontal direction of coordinates of the image, and $m_v$ represents the number of pixels per unit distance in the vertical direction of coordinates of the image. The camera calibration module is further configured to acquire, according to the polyhedral target, a translation matrix $T_j$ and a rotation matrix $R_j$ of each of the pentagonal and hexagonal planes where the markers are located. The numerical optimization module 430 is configured to optimize the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, thereby determining imaging model parameters of the fisheye camera.

Furthermore, the camera calibration module 420 is further configured to select the radial distortion model $r=k_1\theta+k_2\theta^3+k_3\theta^5+k_4\theta^7+k_5\theta^9$ and the equidistant projection model $r=f\theta$, where r represents a distance from a point in the target image to the distortion center, f represents the focal length of the fisheye camera, and $\theta$ represents an angle between an incident light and the optical axis of the fisheye camera. The camera calibration module 420 is further configured to fit the distortion model with the equidistant projection model to obtain $k_1=f$ and $k_2=0$, with the initial values of $k_3$, $k_4$ and $k_5$ set as 0.

Furthermore, the camera calibration module 420 is further configured to calculate the radius $r_{max}$ as $f*\theta_{max}$, i.e., $r_{max}=F*\theta_{max}$, according to $k_1=f$, $k_2=0$, as well as $k_3$, $k_4$, and $k_5$ which are all initially set as 0, and based on the equation $r_{max}=k_1\theta_{max}+k_2\theta_{max}^3+k_3\theta_{max}^5+k_4\theta_{max}^7+k_5\theta_{max}^9$.

Furthermore, the camera calibration module 420 is further configured to perform ellipse fitting on the polyhedral target in the target image, to obtain an ellipse fitting equation $$\left(\frac{u-u_0}{a}\right)^2 + \left(\frac{v-v_0}{b}\right)^2 = 1,$$

where a is the length of the major axis of an ellipse, and b is the length of the minor axis of the ellipse; acquire boundary points of the polyhedral target in the target image to obtain values of a, b, and thus obtain initial values of $u_0$ and $v_0$ according to the values of a and b and the ellipse fitting equation, where ($u_0$, $v_0$) represents the principle point. The camera calibration module is further configured to obtain initial values of $m_u$ and $m_v$, according to the values of a, b and $r_{max}$ and equations $m_u=a/r_{max}$ and $m_v=b/r_{max}$.

Furthermore, the camera calibration module 420 is further configured to: obtain a translation matrix $T_j$ and a rotation matrix $R_j$ of each pentagonal or hexagonal plane relative to the world coordinate system, based on relationships that the vertexes of the spliced inner surface of the polyhedral target are located on a first virtual spherical surface, the distances from the center of sphere of the first virtual spherical surface to the vertexes are equal, and a line connecting the center of sphere of the first virtual spherical surface to the center of each pentagonal or hexagonal plane is perpendicular to the pentagonal or hexagonal plane; and obtain coordinates of each of the markers relative to the world coordinate system, according to the translation matrix $T_j$ and the rotation matrix $R_j$ of each pentagonal or hexagonal plane relative to the world coordinate system, and relationships that the center of each marker layer coincides with the center of the respective pentagonal or hexagonal plane, and one side of each marker layer is parallel to one side of the respective pentagonal or hexagonal plane.

Furthermore, the numerical optimization module 430 is further configured to use the Levenberg-Marquardt algorithm to minimize the sum of squares of differences between projection values and respective measurement values of the markers disposed on the polyhedral target.

It should be noted that those skilled in the art can clearly understand that the specific working processes of the device and modules described above can be referred to the corresponding processes in the foregoing method embodiments, which will not be repeated here for the convenience and conciseness of description.

In summary, in the fisheye camera calibration method and device provided in the embodiments of the present disclosure, the target image of the polyhedral target is captured, where the polyhedral target and the multiple markers disposed on the inner surface of the polyhedral target are captured in the target image. Based on the target image, the selected radial distortion model is fitted with the equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$ and $k_5$ and the equation $r_{max}=k_1\theta_{max}+k_2\theta_{max}^3+k_3\theta_{max}^5+k_4\theta_{max}^7+k_5\theta_{max}^9$, the radius $r_{max}$ is calculated, where $\theta_{max}$ represents the maximum field of view of the fisheye camera. Ellipse fitting is performed on the polyhedral target in the target image, and initial values of $u_0$, $v_0$, $m_u$ and $m_v$ are obtained according to the fitted ellipse and the value of $r_{max}$, where ($u_0$, $v_0$) represents the principal point, $m_u$ represents the number of pixels per unit distance in a horizontal direction of coordinates of the image, and $m_v$ represents the number of pixels per unit distance in a vertical direction of coordinates of the image. The translation matrix $T_j$ and rotation matrix $R_j$ of each of the pentagonal and hexagonal planes where the markers are located are acquired according to the polyhedral target. The initial values of the high-order distortion parameters $k_3$, $k_4$ and $k_5$ are set as 0. The Levenberg-Marquardt algorithm is used to optimize the initial values of these parameters ($k_1$, $k_2$, $k_3$, $k_4$, $k_5$, $u_0$, $v_0$, $m_u$, $m_v$, $T_j$ and $R_j$), to determine the imaging model parameters of the fisheye camera. By adopting the polyhedral target, there is no need to move the target or the camera to capture multiple target images, and only one target image is sufficient to realize fast and high-precision calibration of the fisheye camera In the embodiments provided in this disclosure, the coupling, including direct coupling or communication connection, between the modules shown or discussed may be indirect coupling or communication connection by means of some interfaces, devices or modules, which may be electrical, mechanical or in other form.

In addition, the functional modules in the embodiments of the disclosure may be integrated into one processing module, or each of the modules may exist alone physically, or two or more modules may be integrated into one module. The integrated module may be implemented in hardware or software functional module(s).

Figure 12:
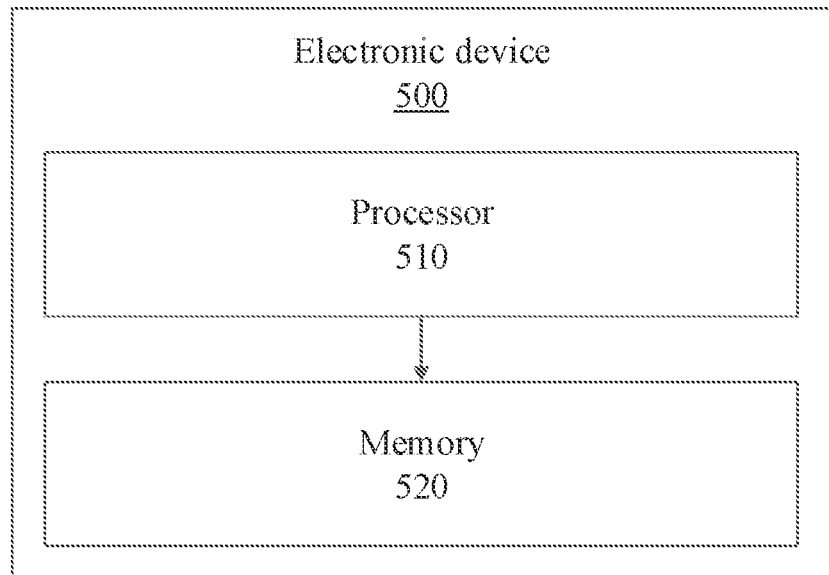
FIG. 12 is a structural block diagram illustrating an electronic device provided by the embodiments of the present disclosure, which is configured to execute the fisheye camera calibration method provided by the embodiments of the present disclosure.

Referring to FIG. 12, a structural block diagram of an electronic device provided by the embodiments of the present disclosure is illustrated. The electronic device 500 may be a mobile terminal capable of data processing, such as a mobile phone or a tablet computer.

The electronic device 500 provided by the embodiments of the present disclosure may include one or more of the following components: a processor 510, a memory 520, and one or more application programs, where the one or more application programs may be stored in the memory 520 and configured to be executed by the one or more processors 510, and the one or more programs are configured to execute the method described in the foregoing method embodiments.

The processor 510 may include one or more processing cores. The processor 510 uses various interfaces and lines to connect various parts of the entire electronic device 500, and performs various functions and data processing of the electronic device 500 by running or executing instructions, programs, code sets, or instruction sets stored in the memory 520 and calling data stored in the memory 520. Optionally, the processor 510 may be implemented in least one selected from a Digital Signal Processor (DSP), a Field-Programmable Gate Array (FPGA), and a Programmable Logic Array (PLA). The processor 510 may be integrated with one or a more of a Central Processing Unit (CPU), a Graphics Processing Unit (GPU), a modem and the like. The CPU mainly copes with the operating system, user interface, and application programs. The GPU is responsible for rendering and drawing of display contents. The modem is used for processing wireless communication. It is understandable that the modem may not be integrated into the processor 510, and may be implemented by a separate communication chip.

The memory 520 may include a Random Access Memory (RAM), and may also include a Read-Only Memory (ROM). The memory 520 may be used to store instructions, programs, codes, code sets or instruction sets. The memory 520 may include a program storage area and a data storage area. The program storage area may store instructions for implementing the operating system, instructions for implementing at least one function (such as touch function, sound playback function, image playback function, etc.), and instructions for implementing the various method embodiments, and the like. The data storage area can also store data created by the electronic device 500 during use (such as phone book, audio and video data, chat record data), and the like.

Figure 13:
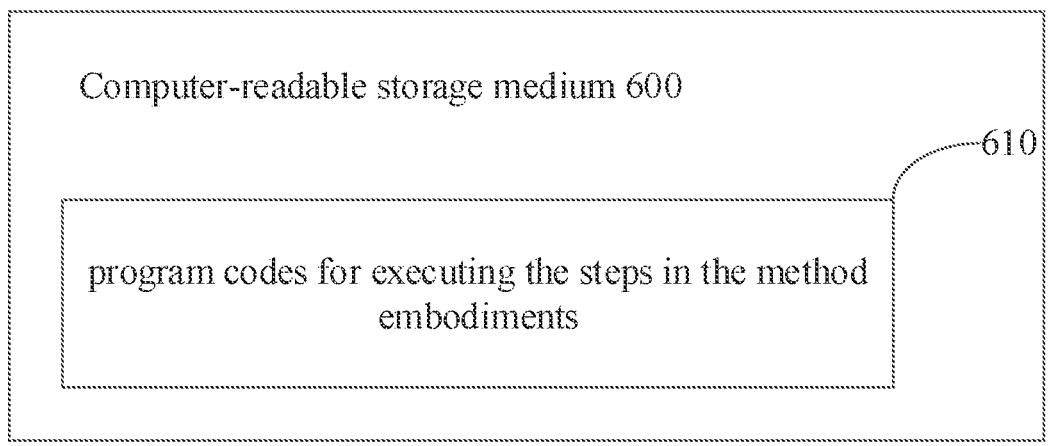
FIG. 13 shows schematically a storage medium provided by the embodiments of the present disclosure, which is configured to store or carry program codes for implementing the fisheye camera calibration method provided by the embodiments of the present disclosure.

Referring to FIG. 13, a structural block diagram of a computer-readable storage medium provided by the embodiments of the present disclosure is shown. The computer-readable storage medium 600 stores program codes 610 therein, and the program codes can be invoked by the processor to execute the method described in the foregoing method embodiments.

The computer-readable storage medium 600 may be an electronic memory, such as a flash memory, an Electrically Erasable Programmable Read Only Memory (EEPROM), an EPROM, a hard disk, or a ROM. Optionally, the computer-readable storage medium 600 includes a non-transitory computer-readable storage medium. The computer-readable storage medium 600 has a storage space for the program codes 610 for executing any method steps in the above-mentioned methods. These program codes can be read from or written into one or more computer program products. The program codes 610 may be for example compressed in a suitable form.

Finally, it should be noted that the above embodiments are only used to illustrate the technical solutions of the disclosure, rather than limiting them. Although the disclosure has been described in detail with reference to the foregoing embodiments, those of ordinary skill in the art should understand that, the technical solutions recited in the foregoing embodiments can also be modified, or some of the technical features thereof can also be equivalently replaced, and such modifications or replacements do not cause the essence of the corresponding technical solutions to depart from the spirit and scope of the technical solutions of the embodiments of the present disclosure.

What is claimed is:

1. A fisheye camera calibration system, comprising:
a polyhedral target, comprising an inner surface and a plurality of markers disposed on the inner surface, the inner surface being composed of a plurality of hexagonal planes and a plurality of pentagonal planes;
a fisheye camera, configured to photograph the polyhedral target to capture a target image, wherein the polyhedral target and the plurality of markers disposed on the inner surface are captured in the target image; and
an electronic device, configured to:
  fit, according to the target image, a selected radial distortion model with an equidistant projection model, to obtain initial values of distortion parameters $k_1$, $k_2$, $k_3$, $k_4$ and $k_5$;
  calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7=k_5\theta_{max}^9$, where $\theta_{max}$ represents a maximum field of view of the fisheye camera;
  perform ellipse fitting on the polyhedral target in the target image, and obtain initial values of $u_0$, $v_0$, $m_u$ and $m_v$ according to the fitted ellipse and the value of $r_{max}$, where ($u_0$, $v_0$) represents a principal point, $m_u$ represents the number of pixels per unit distance in a horizontal direction of coordinates of the target image, and $m_v$ represents the number of pixels per unit distance in a vertical direction of coordinates of the target image;

acquire, according to the polyhedral target, a translation matrix $T_j$ and a rotation matrix $R_j$ of each of the pentagonal and hexagonal planes where the markers are located; and optimize the initial values of $k_1$, $k_2$, $k_3$, $k_4$, $k_5$, $u_0$, $v_0$, $m_u$, $v_y$, $T_j$ and $R_j$ by using a Levenberg-Marquardt algorithm, thereby determining imaging model parameters of the fisheye camera.

2. The system as claimed in claim 1, wherein the polyhedral target comprises a housing, the inner surface is defined inside the housing, and the inner surface is a hemispherical-like inner surface formed by splicing the plurality of pentagonal planes and the plurality of hexagonal planes, vertexes formed through the splicing are located on a first virtual spherical surface, and a line connecting a center of sphere of the first virtual spherical surface and a center of each one of the hexagonal and pentagonal planes is perpendicular to the one of the hexagonal and pentagonal planes.

3. The system as claimed in claim 2, wherein all the pentagonal planes of the inner surface are tangent to a second virtual spherical surface, all the hexagonal planes of the inner surface are tangent to a third virtual spherical surface, and a center of sphere of the second virtual spherical surface and a center of sphere of the third virtual spherical surface both coincide with the center of sphere of the first virtual spherical surface.

4. The system as claimed in claim 3, wherein the plurality of hexagonal planes comprise 8 complete regular-hexagonal planes and 4 partial regular-hexagonal planes, the plurality of pentagonal planes comprise 4 complete regular-pentagonal planes and 4 partial regular-pentagonal planes, and the length of sides of the pentagonal planes is equal to the length of sides of the hexagonal planes; and wherein each of the partial regular-pentagonal planes is a half regular-pentagonal plane, and each of the partial regular-hexagonal planes is a half regular-hexagonal plane.

5. The system as claimed in claim 2, wherein the polyhedral target further comprises a marker layer containing the plurality of markers, the marker layer comprises a plurality of marker sub-layers, each of the marker sub-layers is provided with a plurality of markers of different sizes, and each of the marker sub-layers is attached onto one of the plurality of hexagonal and pentagonal planes; and wherein a center of each of the marker sub-layers coincides with a center of the respective hexagonal or pentagonal plane, and one side of each of the marker sub-layers is parallel to one side of the respective hexagonal or pentagonal plane.

6. The system as claimed in claim 1, wherein the plurality of markers are provided by a plurality of holes formed in the inner surface, the polyhedral target further comprises at least one light source disposed at an opposite side from the inner surface, and the plurality of markers are formed when light emitted from the at least one light source passes through the plurality of holes.

7. The system as claimed in claim 2, wherein the plurality of pentagonal planes are a plurality of pentagonal metal sheets, and the plurality of hexagonal planes are a plurality of hexagonal metal sheets.

8. The system as claimed in claim 2, wherein the fisheye camera is disposed at the center of sphere of the first virtual spherical surface.

9. The system as claimed in claim 2, wherein the electronic device is further configured to:

select the radial distortion model $r=k_1\theta+k_2\theta^3+k_3\theta^5+k_4\theta^7+k_5\theta^9$ and the equidistant projection model $r=f\theta$, where r represents a distance from a point in the target image to a distortion center, f represents a focal length of the fisheye camera, and $\theta$ represents an angle between an incident light and an optical axis of the fisheye camera;

fit the radial distortion model with the equidistant projection model, to obtain $k_1=f$ and $k_2=0$, with the initial values of the distortion parameters $k_3$, $k_4$ and $k_5$ set as 0; and calculate the radius $r_{max}$ as $f*\theta_{max}$, i.e., $r_{max}=f*\theta_{max}$, according to $k_1=f$, $k_2=0$, the initial values of $k_3$, $k_4$ and $k_5$ that are set as 0, and the equation $r_{max}=k_1\theta_{max}+k_2\theta_{max}^3+k_3\theta_{max}^5+k_4\theta_{max}^7+k_5\theta_{max}^9$.

10. The system as claimed in claim 9, wherein the electronic device is further configured to:

perform ellipse fitting on the polyhedral target in the target image, to obtain an ellipse fitting equation $$\left(\frac{u-u_0}{a}\right)^2 + \left(\frac{v-v_0}{b}\right)^2 = 1,$$

equation where a is a length of a major axis of an ellipse, and b is a length of a minor axis of the ellipse;

acquire boundary points of the polyhedral target in the target image, to obtain values of a and b;

obtain initial value of $u_0$ and $v_0$, according to the values of a and b and the ellipse fitting equation; and obtain initial values of $m_u$ and $m_v$, according to the values of a, b and $r_{max}$, and equations $m_u=a/r_{max}$ and $m_v=b/r_{max}$.

11. The system as claimed in claim 5, wherein the electronic device is further configured to:

obtain the translation matrix $T_j$ and the rotation matrix $R_j$ of each of the pentagonal and hexagonal planes relative to a world coordinate system, based on relationships that the vertexes of the spliced inner surface of the polyhedral target are located on the first virtual spherical surface, distances from the center of sphere of the first virtual spherical surface to the vertexes are equal, and the line connecting the center of sphere of the first virtual spherical surface to the center of each one of the pentagonal and hexagonal planes is perpendicular to the one of the pentagonal and hexagonal planes; and obtain coordinates of each of the plurality of markers relative to the world coordinate system, according to the translation matrix $T_j$ and the rotation matrix $R_j$ of each of the pentagonal and hexagonal planes relative to the world coordinate system, and relationships that the center of each of the marker sub-layers coincides with the center of the respective pentagonal or hexagonal plane, and one side of each of the marker sub-layers is parallel to one side of the respective pentagonal or hexagonal plane, wherein the world coordinate system is established according to the polyhedral target, and the origin of the world coordinate system is set at the center of sphere of the first virtual spherical surface.

12. The system as claimed in claim 2, wherein the electronic device is further configured to:

minimize, by using the Levenberg-Marquardt algorithm, a sum of squares of differences between projection values and respective measurement values of the markers disposed on the polyhedral target, wherein the projection value of each marker refers to pixel coordinates corresponding to the marker that are calculated according to the projection model, and the measurement value of each marker refers to pixel coordinates corresponding to the marker in the target image under an image coordinate system.

13. A fisheye camera calibration method, wherein the method is applied to a fisheye camera calibration system comprising a polyhedral target and a fisheye camera to be calibrated, the polyhedral target comprises an inner surface and a plurality of markers disposed on the inner surface, the inner surface is formed by splicing a plurality of hexagonal planes and a plurality of pentagonal planes, and the method comprises:

acquiring a target image captured by the fisheye camera, wherein the polyhedral target and the plurality of markers disposed on the inner surface are captured in the target image;

fitting, according to the target image, a selected radial distortion model with an equidistant projection model, to obtain initial values of distortion parameters $k_1$, $k_2$, $k_3$, $k_4$ and $k_5$;

calculating a radius $r_{max}$ according to the initial values of the distortion parameters $k_1$, $k_2$, $k_3$, $k_4$ and $k_5$ and an equation $r_{max} = k_1\theta_{max} + k_2\theta_{max}^3 + k_3\theta_{max}^5 + k_4\theta_{max}^7 + k_5\theta_{max}^9$, where $\theta_{max}$ represents a maximum field of view of the fisheye camera;

performing ellipse fitting on the polyhedral target in the target image, and obtaining initial values of $u_0$, $v_0$, $m_u$ and $m_v$ according to the fitted ellipse and the value of $r_{max}$, where $(u_0, v_0)$ represents a principal point, $m_u$ represents the number of pixels per unit distance in a horizontal direction of coordinates of the target image, and $m_v$ represents the number of pixels per unit distance in a vertical direction of coordinates of the target image;

acquiring, according to the polyhedral target, a translation matrix $T_j$ and a rotation matrix $R_j$ of each of the pentagonal and hexagonal planes where the markers are located; and optimizing the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, thereby determining imaging model parameters of the fisheye camera.

14. The method as claimed in claim 13, wherein the fitting, according to the target image, a selected radial distortion model with an equidistant projection model, to obtain initial values of distortion parameters $k_1$, $k_2$, $k_3$, $k_4$ and $k_5$, comprises:

selecting a radial distortion model $r = k_1\theta + k_2\theta^3 + k_3\theta^5 + k_4\theta^7 + k_5\theta^9$ and an equidistant projection model $r = f\theta$, where r represents a distance from a point in the target image to a distortion center, f represents a focal length of the fisheye camera, and $\theta$ represents an angle between an incident light and an optical axis of the fisheye camera; and fitting the radial distortion model with the equidistant projection model, to obtain $k_1 = f$ and $k_2 = 0$, with the initial values of the distortion parameters $k_3$, $k_4$ and $k_5$ set as 0.

15. The method as claimed in claim 14, wherein the calculating a radius $r_{max}$ according to the initial values of the distortion parameters $k_1$, $k_2$, $k_3$, $k_4$ and $k_5$ and an equation $r_{max} + k_1\theta_{max} = k_2\theta_{max}^3 = k_3\theta_{max}^5 = +k_4\theta_{max}^7 = k_5\theta_{max}^9$, comprises:

calculating the radius $r_{max}$ as $f^*\theta_{max}$, i.e., $r_{max} + f^*\theta_{max}$, according to $k_1 + f$, $k_2 + 0$, the initial values of $k_3$, $k_4$ and $k_5$ that are set as 0, and the equation $r_{max} + k_1\theta_{max} = k_2\theta_{max}^3 = k_3\theta_{max}^5 + k_4\theta_{max}^7 + k_5\theta_{max}^9$.

16. The method as claimed in claim 15, wherein the performing ellipse fitting on the polyhedral target in the target image, and obtaining initial values of $u_0$, $v_0$, $m_u$ and $m_v$ according to the fitted ellipse and the value of $r_{max}$, comprises:

performing ellipse fitting on the polyhedral target in the target image, to obtain an ellipse fitting equation $$\left(\frac{u-u_0}{a}\right)^2 + \left(\frac{v-v_0}{b}\right)^2 = 1,$$

equation where a is a length of a major axis of an ellipse, and b is a length of a minor axis of the ellipse;

acquiring boundary points of the polyhedral target in the target image, to obtain values of a and b;

obtaining initial value of $u_0$ and $v_0$, according to the values of a and b and the ellipse fitting equation; and obtaining initial values of $m_u$ and $m_v$, according to the values of a, b and $r_{max}$, and equations $m_u = a/r_{max}$ and $m_v = b/r_{max}$.

17. The method as claimed in claim 11, wherein the method further comprises:

acquiring the initial values of $m_u$ and $m_v$, according to parameters of a lens of the fisheye camera.

18. The method as claimed in claim 16, wherein the polyhedral target further comprises a plurality of marker layers, each of the plurality of marker layers comprises a part of the plurality of markers, and each of the plurality of marker layers is attached onto one of the plurality of hexagonal and pentagonal planes;

the acquiring, according to the polyhedral target, a translation matrix $T_j$ and a rotation matrix $R_j$ of each of the pentagonal and hexagonal planes where the markers are located, comprises:

obtaining a translation matrix $T_j$ and a rotation matrix $R_j$ of each of the pentagonal and hexagonal planes relative to a world coordinate system, based on relationships that vertexes of the spliced inner surface of the polyhedral target are located on a first virtual spherical surface, distances from a center of sphere of the first virtual spherical surface to the vertexes are equal, and a line connecting the center of sphere of the first virtual spherical surface to a center of each one of the pentagonal and hexagonal planes is perpendicular to the one of the pentagonal and hexagonal planes; and obtaining coordinates of each of the plurality of markers relative to the world coordinate system, according to the translation matrix $T_j$ and the rotation matrix $R_j$ of each of the pentagonal and hexagonal planes relative to the world coordinate system, and relationships that a center of each of the marker layers coincides with the center of the respective pentagonal or hexagonal plane, and one side of each of the marker layers is parallel to one side of the respective pentagonal or hexagonal plane, wherein the world coordinate system is established according to the polyhedral target, and the origin of the world coordinate system is set at the center of sphere of the first virtual spherical surface.

19. The method as claimed in claim 18, wherein the optimizing the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, comprises:

minimizing, by using the Levenberg-Marquardt algorithm, a sum of squares of differences between projection values and respective measurement values of the markers disposed on the polyhedral target, wherein the projection value of each marker refers to pixel coordinates corresponding to the marker that are calculated according to the projection model, and the measurement value of each marker refers to pixel coordinates corresponding to the marker in the target image under an image coordinate system.

20. An electronic device, comprising:

one or more processors;

a memory, electrically connected to the one or more processors; and one or more application programs, wherein the one or more application programs are stored in the memory and configured to be executed by the one or more processors, and the one or more application programs are configured to implement a method comprising:

acquiring a target image captured by a fisheye camera, wherein a polyhedral target and a plurality of markers disposed on an inner surface of the polyhedral target are captured in the target image, and the inner surface is formed by splicing a plurality of hexagonal planes and a plurality of pentagonal planes;

fitting, according to the target image, a selected radial distortion model with an equidistant projection model, to obtain initial values of distortion parameters $k_1$, $k_2$, $k_3$, $k_4$ and $k_5$;

calculating a radius $r_{max}$ according to the initial values of the distortion parameters $k_1$, $k_2$, $k_3$, $k_4$ and $k_5$ and an equation $r_{max}=k_1\theta_{max}=k_2\theta_{max}^3+k_3\theta_{max}^5+k_4\theta_{max}^7+k_5\theta_{max}^9$, where $\theta_{max}$ represents a maximum field of view of the fisheye camera;

performing ellipse fitting on the polyhedral target in the target image, and obtaining initial values of $u_0$, $v_0$, $m_u$ and $m_v$ according to the fitted ellipse and the value of where $(u_0, v_0)$ represents a principal point of the fisheye camera, $m_u$ represents the number of pixels per unit distance in a horizontal direction of coordinates of the target image, and my represents the number of pixels per unit distance in a vertical direction of coordinates of the target image;

acquiring, according to the polyhedral target, a translation matrix $T_j$ and a rotation matrix $R_j$ of each of the pentagonal and hexagonal planes where the markers are located; and optimizing the initial values of $k_1$, $k_2$, $k_3$, $k_4$, $k_5$, $u_0$, $v_0$, $m_u$, $m_v$, $T_j$ and $R_j$ by using a Levenberg-Marquardt algorithm, thereby determining imaging model parameters of the fisheye camera.

* * * * *